UNITED STATES PATENT OFFICE.

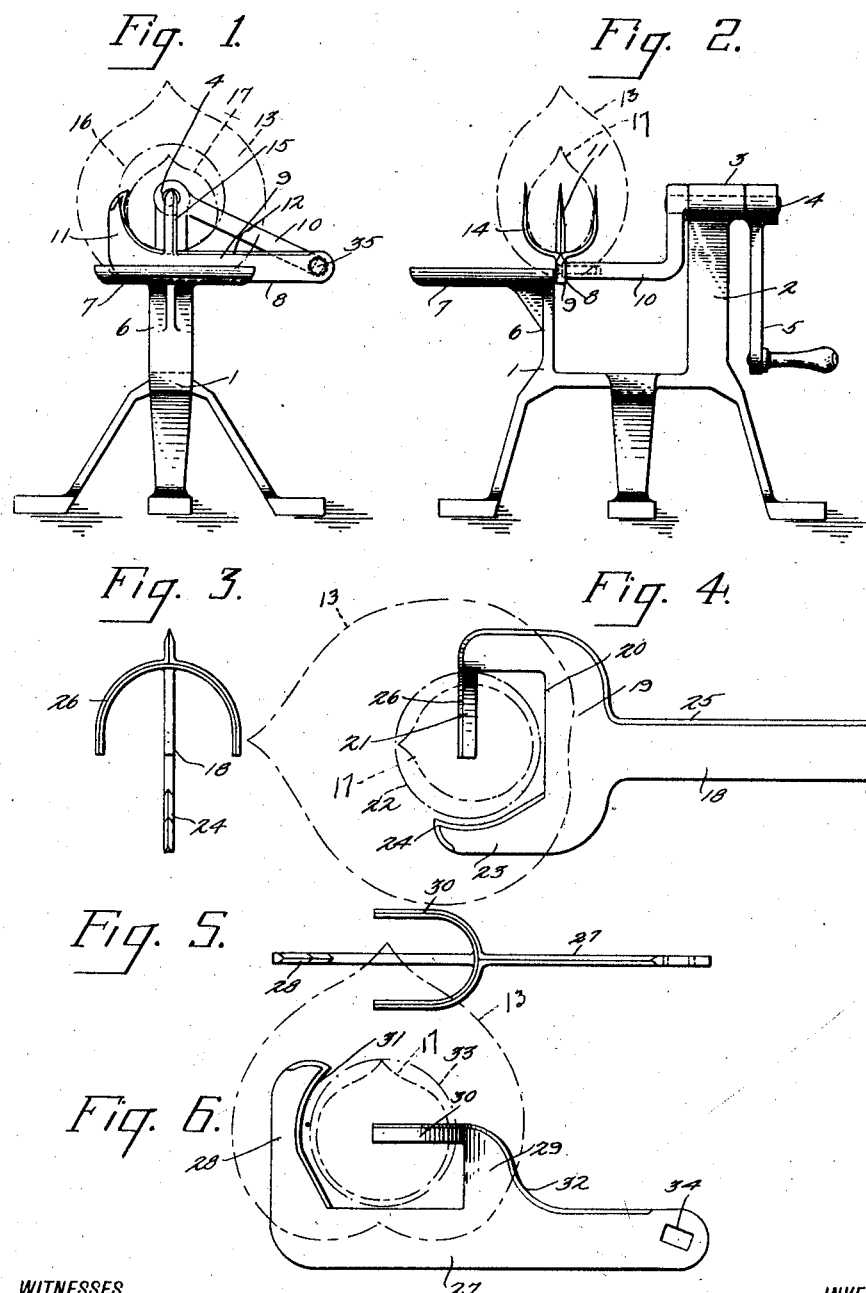

WILLIAM N. RISDON, OF WATSONVILLE, CALIFORNIA, ASSIGNOR OF ONE-HALF TO MRS. I. V. RISDON, OF WATSONVILLE, CALIFORNIA.

FRUIT PITTER AND CUTTER.

1,339,367.                   Specification of Letters Patent.    Patented May 4, 1920.

Application filed December 29, 1919. Serial No. 348,120.

*To all whom it may concern:*

Be it known that I, WILLIAM N. RISDON, a citizen of the United States, and a resident of Watsonville, in the county of Santa Cruz and State of California, have invented a new and Improved Fruit Pitter and Cutter, of which the following is a full, clear, and exact description.

This invention relates to improvements in fruit pitters and cutters, an object of the invention being to provide a simple inexpensive apparatus which will at a single revolution of the drive shaft operate to sever or cut the fruit in half and at the same time cleanly cut out the pit of the fruit.

A further object is to provide a device of the character stated, which can be manufactured and sold at a reasonably low price, and which will most efficiently perform the functions for which it is intended.

With these and other objects in view the invention consists in certain novel features of construction, and combinations and arrangements of parts, as will be more fully hereinafter described and pointed out in the claims.

In the accompanying drawings—

Figure 1 is a view in side elevation illustrating a preferred form of my invention;

Fig. 2 is a view in elevation at right angles to Fig. 1;

Fig. 3 is an end view of a modified form of cutting tool;

Fig. 4 is a side elevation of the cutting tool shown in Fig. 3;

Fig. 5 is a plan view illustrating another modification; and

Fig. 6 is a view in elevation of the device shown in Fig. 5.

Referring particularly to Figs. 1 and 2, 1 represents a supporting frame provided with a standard 2 at one end having a bearing 3 at the upper end of the standard supporting a drive shaft 4. A crank arm 5 is secured on the outer end of the drive shaft 4 to turn the same. A relatively short standard 6 is provided at the other end of the frame and supports a table 7 which constitutes a hand or arm rest.

It will be noted that between the standards 2 and 6 a relatively wide open space is provided which is sufficient for the manipulation of my improved cutting tool 8 which consists of a blade 9 secured at one end to a crank arm 10 fixed to the shaft 4. This crank arm 10 is angular in form, as shown in Fig. 2, and it is to be understood that the arm has a rigid connection with the end of the tool 8 as well as with the shaft 4.

The blade 9 has a curved end 11 and is provided with a sharp cutting edge 12 which extends throughout its length and also throughout the curved end 11, and this cutting edge is adapted to cut the fruit, indicated by the reference numeral 13, in half. At a point adjacent the curved end 11 of the blade a V-shaped cutting fork 14 is fixed to the blade with the intermediate portion of the fork connected to the blade and this connection may be formed in any desired manner or the fork may be made integral with the blade, if desired.

The fork is provided with a cutting edge 15 and the ends of the fork are always maintained in alinement with the axial center of the shaft 4, so that the intermediate portion of the fork turns in the arc of a circle concentric with the axis of the shaft, as indicated by the circular line 16, so that the movement of the fork operates to completely cut out the pit 17 of the fruit 13.

In operation, the fruit 13 is forced downwardly onto the cutting tool, as shown in Figs. 1 and 2, with the pit 17 of the fruit located within the fork 14 and the lower portion of the fruit cut by the blade 9. The crank arm 5 is then operated to turn the shaft 4 which results in moving the fork in the circular path, indicated at 16, to cut out the pit and also serves to move the blade 9 completely around to cut the fruit in half. The fruit may be conveniently held at one side of the cutting tool so as to steady it during the cutting operation and a single turning movement of the shaft 4 will perform the double function of removing the pit and cutting the fruit in half.

In the modification illustrated in Fig. 3, the tool 18 has an enlarged end 19 with a recess 20 therein, and the fork 21, corresponding to the fork 14, is made integral with the tool at one side of the said recess with the ends of the fork projecting at right angles to the longitudinal axis of the tool and movable in a circular path indicated by the line 22. A fork 23 at one end of the recess 20 is provided with a sharp cutting edge 24 and a cutting edge 25 is provided throughout the length of the tool on its upper edge, this term "upper" having reference to Fig. 4, as it is, of course, to be understood that the tool is to revolve in use. The cutting edges 24 and 25 operate to cut the fruit in half and the fork 21 has a sharp cutting edge 26 which operates to cut out the pit of the fruit.

In the modification illustrated in Figs. 5 and 6, the tool 27 is formed with a projecting end 28 and an arm 29 intermediate its ends. The arm 29 supports the fork 30, corresponding to the forks 14 and 21, and the end 28 has a cutting edge 31 while the main portion of the tool has a cutting edge 32 which coöperates to cut the fruit in half. In this modification illustrated in Fig. 6, the fork 30 turns in the arc of a circle indicated by the line 33 to remove the pit of the fruit simultaneously with the operation of the tool to sever the fruit in half. As a convenient means of attaching the tool to the crank arm 10 an angular recess 34 may be provided in the end of the tool to receive an angular lug 35 on the arm, or other form of securing device, which will rigidly connect the arm and the tool.

Various other slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A device of the character stated, comprising a rotary fork having a cutting edge, and a member connected to the intermediate portion of the fork and having a cutting edge thereon.

2. A device of the character stated, comprising a fork having a cutting edge, a member connected to the intermediate portion of the fork and having a cutting edge thereon, and means for turning the device in a circular path concentric with the ends of the fork.

3. A device of the character stated, comprising a rotary blade, and a fork fixed at its intermediate portion to the blade and having a sharp cutting edge.

4. A device of the character stated, comprising a blade, a fork fixed at its intermediate portion to the blade and having a sharp cutting edge, and means for turning the device in the arc of a circle concentric with the ends of the fork.

5. A device of the character stated, comprising a support, a shaft having rotary mounting on the support, means for turning the shaft, a crank arm fixed to the shaft, a cutting tool secured to the crank arm and having a longitudinal cutting edge, and a fork fixed to the blade at its intermediate portion, said fork having a cutting edge and having its ends located in axial alinement with the shaft.

6. A device of the character stated, comprising a support, a shaft having rotary mounting on the support, means for turning the shaft, a crank arm fixed to the shaft, a cutting tool secured to the crank arm and having a longitudinal cutting edge, a fork fixed to the blade at its intermediate portion, said fork having a cutting edge and having its ends located in axial alinement with the shaft, and said blade having a curved free end with a sharp cutting edge.

7. A device of the character stated, comprising a support, standards on the support, a table on one standard, a bearing on the other standard, a shaft in the bearing, an operating crank arm on one end of the shaft, a crank arm on the other end of the shaft, a cutting tool secured at one end to the last-mentioned crank arm, and said cutting tool comprising a blade having a sharp cutting edge, and a fork fixed to the blade at the intermediate portion of the fork, said fork having a sharp cutting edge and having its ends located in axial alinement with the shaft.

WILLIAM N. RISDON.